(12) United States Patent
Wong et al.

(10) Patent No.: US 10,621,005 B2
(45) Date of Patent: Apr. 14, 2020

(54) SYSTEMS AND METHODS FOR PROVIDING ZERO DOWN TIME AND SCALABILITY IN ORCHESTRATION CLOUD SERVICES

(71) Applicant: Oracle International Corporation, Redwood Shores, CA (US)

(72) Inventors: Lik Wong, Palo Alto, CA (US); Girish Kumar Balachandran, Fremont, CA (US); Taylor Scott Gautier, Hood River, OR (US); Shravan Kumar Shivanagari, Sr., Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 24 days.

(21) Appl. No.: 15/970,723

(22) Filed: May 3, 2018

(65) Prior Publication Data

US 2019/0065275 A1 Feb. 28, 2019

Related U.S. Application Data

(60) Provisional application No. 62/553,108, filed on Aug. 31, 2017.

(51) Int. Cl.
*G06F 9/50* (2006.01)
*H04L 29/08* (2006.01)
(Continued)

(52) U.S. Cl.
CPC .............. *G06F 9/5072* (2013.01); *G06F 8/60* (2013.01); *G06F 8/65* (2013.01); *G06F 9/4843* (2013.01);
(Continued)

(58) Field of Classification Search
None
See application file for complete search history.

(56) References Cited

U.S. PATENT DOCUMENTS 6,597,777 B1 7/2003 Ho
7,672,814 B1 3/2010 Raanan et al.
(Continued)

FOREIGN PATENT DOCUMENTS

CN 105426411 A 3/2016

OTHER PUBLICATIONS

Hao et al., Visual Analytics of Anomaly Detection in Large Data Streams, Proc. SPIE 7243, Visualization and Data Analysis 2009, 10 pages.

(Continued)

*Primary Examiner* — Scott B Christensen
(74) *Attorney, Agent, or Firm* — Invoke

(57) ABSTRACT

Techniques are described herein for providing highly available and scalable cloud services. In one or more embodiments, a network service receives from a first client of a plurality of clients, a request to lease a first slice of a plurality of slices of a workload. In response, the network services assigning, to the first client, a lease for the first slice, wherein the lease expires after a lease duration. The network service then receives, from a second client of the plurality of clients, a request to lease the first slice. Based on a state associated with the first client after the lease duration, the network service reassigns the lease for the first slice to the second client. The second client processes a subset of workflow executions associated with the first slice that have not previously been processed by the first client.

20 Claims, 12 Drawing Sheets

(51) Int. Cl.
  *G06F 8/60* (2018.01)
  *H04L 12/24* (2006.01)
  *G06F 8/65* (2018.01)
  *G06F 9/48* (2006.01)
  *G06F 11/07* (2006.01)

(52) U.S. Cl.
  CPC .......... *G06F 9/5011* (2013.01); *G06F 9/5027* (2013.01); *G06F 9/5038* (2013.01); *G06F 9/5083* (2013.01); *G06F 11/0721* (2013.01); *G06F 11/0751* (2013.01); *G06F 11/0793* (2013.01); *H04L 41/00* (2013.01); *H04L 41/5025* (2013.01); *H04L 41/5051* (2013.01); *H04L 67/1008* (2013.01); *H04L 67/1034* (2013.01); *H04L 41/5096* (2013.01)

(56) References Cited

U.S. PATENT DOCUMENTS

| | | | |
|---|---|---|---|
| 8,583,649 | B2 | 11/2013 | Ailon et al. |
| 8,635,328 | B2 | 1/2014 | Corley et al. |
| 8,676,964 | B2 | 3/2014 | Gopalan et al. |
| 8,776,066 | B2 * | 7/2014 | Krishnamurthy ..... G06F 9/5038 718/102 |
| 8,949,677 | B1 | 2/2015 | Brundage et al. |
| 9,053,171 | B2 | 6/2015 | Ailon et al. |
| 9,141,914 | B2 | 9/2015 | Viswanathan et al. |
| 9,195,563 | B2 | 11/2015 | Scarpelli |
| 9,471,778 | B1 | 10/2016 | Seo et al. |
| 9,495,220 | B2 * | 11/2016 | Talyansky ........... H04L 41/0823 |
| 9,495,395 | B2 | 11/2016 | Chan et al. |
| 9,507,718 | B2 | 11/2016 | Rash et al. |
| 9,529,630 | B1 | 12/2016 | Fakhouri et al. |
| 9,740,402 | B2 * | 8/2017 | Manoharan ........... G06F 3/0608 |
| 9,811,394 | B1 | 11/2017 | Kogias et al. |
| 2002/0183972 | A1 | 12/2002 | Enck et al. |
| 2002/0188650 | A1 * | 12/2002 | Sun ....................... G06F 9/4843 718/105 |
| 2005/0119982 | A1 | 6/2005 | Ito et al. |
| 2007/0011281 | A1 | 1/2007 | Jhoney et al. |
| 2007/0150329 | A1 | 6/2007 | Brook et al. |
| 2008/0288089 | A1 | 11/2008 | Pettus et al. |
| 2010/0082132 | A1 | 4/2010 | Marruchella et al. |
| 2010/0082697 | A1 | 4/2010 | Gupta et al. |
| 2010/0324869 | A1 | 12/2010 | Cherkasova et al. |
| 2011/0022879 | A1 | 1/2011 | Chavda et al. |
| 2012/0066389 | A1 * | 3/2012 | Hegde ................... G06F 9/4856 709/226 |
| 2012/0110462 | A1 * | 5/2012 | Eswaran ............... G06F 9/5072 715/736 |
| 2012/0110583 | A1 | 5/2012 | Balko et al. |
| 2012/0240072 | A1 | 9/2012 | Altamura et al. |
| 2012/0323988 | A1 * | 12/2012 | Barzel ..................... H04L 43/08 709/202 |
| 2013/0329981 | A1 | 12/2013 | Hiroike |
| 2014/0101300 | A1 | 4/2014 | Rosensweig et al. |
| 2014/0215470 | A1 | 7/2014 | Iniguez |
| 2014/0325649 | A1 | 10/2014 | Zhang |
| 2015/0032775 | A1 | 1/2015 | Yang et al. |
| 2015/0046920 | A1 * | 2/2015 | Allen ................... G06F 9/5027 718/1 |
| 2015/0180734 | A1 | 6/2015 | Maes et al. |
| 2015/0242243 | A1 * | 8/2015 | Balakrishnan ........ G06F 9/5011 718/104 |
| 2015/0244597 | A1 | 8/2015 | Maes et al. |
| 2015/0251074 | A1 | 9/2015 | Ahmed et al. |
| 2015/0296030 | A1 | 10/2015 | Maes et al. |
| 2015/0312274 | A1 | 10/2015 | Bishop et al. |
| 2016/0034328 | A1 | 2/2016 | Poola et al. |
| 2016/0042289 | A1 | 2/2016 | Poola et al. |
| 2016/0092516 | A1 | 3/2016 | Poola et al. |
| 2016/0171037 | A1 | 6/2016 | Mathur et al. |
| 2016/0253381 | A1 | 9/2016 | Kim et al. |
| 2016/0292611 | A1 | 10/2016 | Boe et al. |
| 2016/0294773 | A1 | 10/2016 | Yu et al. |
| 2016/0299938 | A1 | 10/2016 | Malhotra et al. |
| 2016/0357674 | A1 * | 12/2016 | Waldspurger ....... G06F 12/0893 |
| 2017/0249564 | A1 | 8/2017 | Garvey et al. |
| 2017/0249648 | A1 | 8/2017 | Garvey et al. |
| 2017/0249649 | A1 | 8/2017 | Garvey et al. |
| 2017/0249763 | A1 | 8/2017 | Garvey et al. |
| 2017/0262223 | A1 * | 9/2017 | Dalmatov ............. G06F 3/0605 |
| 2017/0364851 | A1 | 12/2017 | Maheshwari et al. |
| 2018/0026907 | A1 * | 1/2018 | Miller .................. G06F 3/0613 709/226 |
| 2018/0052804 | A1 | 2/2018 | Mikami et al. |
| 2018/0321989 | A1 | 11/2018 | Shetty et al. |
| 2018/0330433 | A1 | 11/2018 | Frenzel et al. |
| 2019/0065275 | A1 | 2/2019 | Wong et al. |

OTHER PUBLICATIONS

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Ahmed, Reservoir-based network traffic stream summarization for anomaly detection, Article in Pattern Analysis and Applications, Oct. 2017.

Charapko, Gorilla—Facebook's Cache for Time Series Data, http://charap.co/gorilla-facebooks-cashe-for-monitoring-data/, Jan. 11, 2017.

Wilks, Samuel S. "Determination of sample sizes for setting tolerance limits." The Annals of Mathematical Statistics 12.1 (1941): 91-96.

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Lin, Xuemin, et al. "Continuously maintaining quantile summaries of the most recent n elements over a data stream." IEEE, 2004.

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-Digests.

Greunen, "Forecasting Methods for Cloud Hosted Resources, a comparison," 2015, 11th International Conference on Network and Service Management (CNSM), pp. 29-35 (Year: 2015).

Faraz Rasheed, "A Framework for Periodic Outlier Pattern Detection in Time-Series Sequences," May 2014, IEEE.

Slipetskyy, Rostyslav, "Security Issues in OpenStack", Masters Thesis, Technical University of Denmark, Jun. 2011, p. 7 (entire document especially abstract).

Yokoyama, Tetsuya, "Windows Server 2008, Certification Test, Part 5: Reliability", Apr. 15, 2008, pp. 124-125 along with 4 pages of English Translation.

* cited by examiner

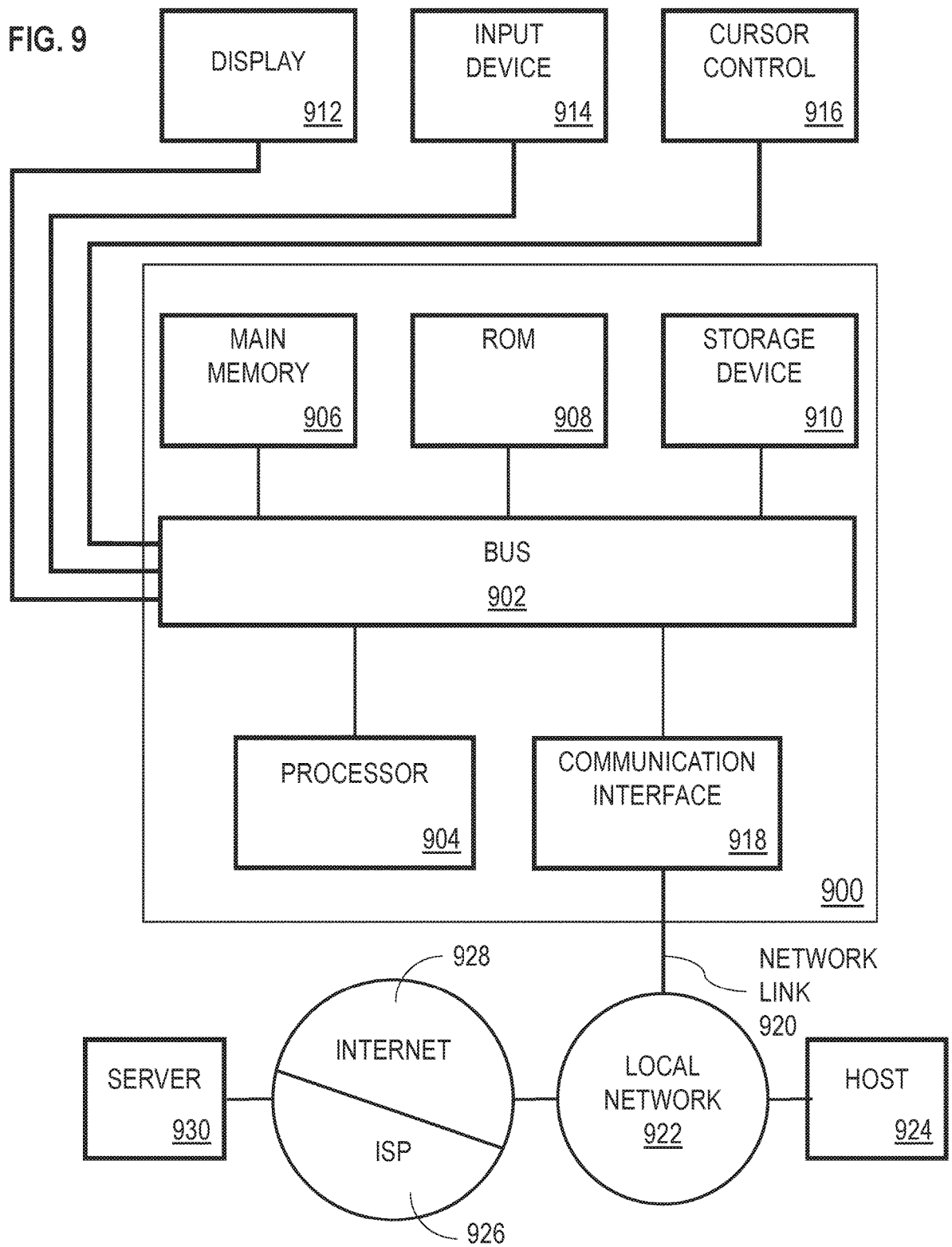

SYSTEMS AND METHODS FOR PROVIDING ZERO DOWN TIME AND SCALABILITY IN ORCHESTRATION CLOUD SERVICES

RELATED APPLICATIONS; INCORPORATION BY REFERENCE

This application relates to U.S. Provisional Patent Application 62/553,108, filed Aug. 31, 2017, which is hereby incorporated by reference.

TECHNICAL FIELD

The present disclosure relates to techniques for orchestrating execution of multi-step processes in computing environments. In particular, the present disclosure relates to executing multi-step processes in a manner that is both highly scalable and highly available.

BACKGROUND

Orchestration cloud services are applications that facilitate the creation, coordination, and management of other cloud-based services, such software as a service (SaaS) and platform as a service (PaaS) offerings. For example, orchestration cloud services may be responsible for automatically scaling up cloud service offerings by deploying additional hardware and software resources to satisfy increased demand. As another example, an orchestration cloud service may automatically apply patches and other updates to the underlying cloud computing resources to fix bugs, address security vulnerabilities, and improve performance.

High availability is a goal for many cloud services. A service with high availability has little to zero downtime with minimal performance degradation, despite intrinsic failures, such as network outages and hardware breakdowns. An orchestration cloud service may be expected to perform maintenance operations, such as upgrades, without compromising performance or availability of the service being upgraded. An orchestration cloud service may also be expected to be highly available itself. Any service outages or performance degradation of the orchestration cloud service may also compromise the availability of the cloud service for which the orchestration operations are being performed. For example, if an orchestration cloud service fails to efficiently update an SaaS application, the SaaS application may be left vulnerable to security violations, leading to downtime or performance degradation.

One approach to reduce downtime during upgrade operations is referred to as the Blue and Green deployment model. According to this approach, two identical production environments, referred to as Blue and Green, are established. However, only one environment is live, and the other is idle. The orchestration cloud service then upgrades the idle production environment while the live production environment continues to operate. Once the upgrade is complete, the idle production environment is brought online, and the live environment is brought down to an idle state.

The Blue and Green deployment model allows upgrades to be performed with little to zero downtime. However, this approach typically does not reduce downtime in non-upgrade orchestration operations. For these operations, the orchestration service may still need to bring down the live production environment. In addition, the Blue and Green deployment model does not ensure the availability of the orchestration cloud service. The orchestration service may fail before or during an orchestration operation, resulting in delays and potentially exposing the production environment to longer outages and performance degradation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with one or more embodiments.

DETAILED DESCRIPTION

Figure 1:
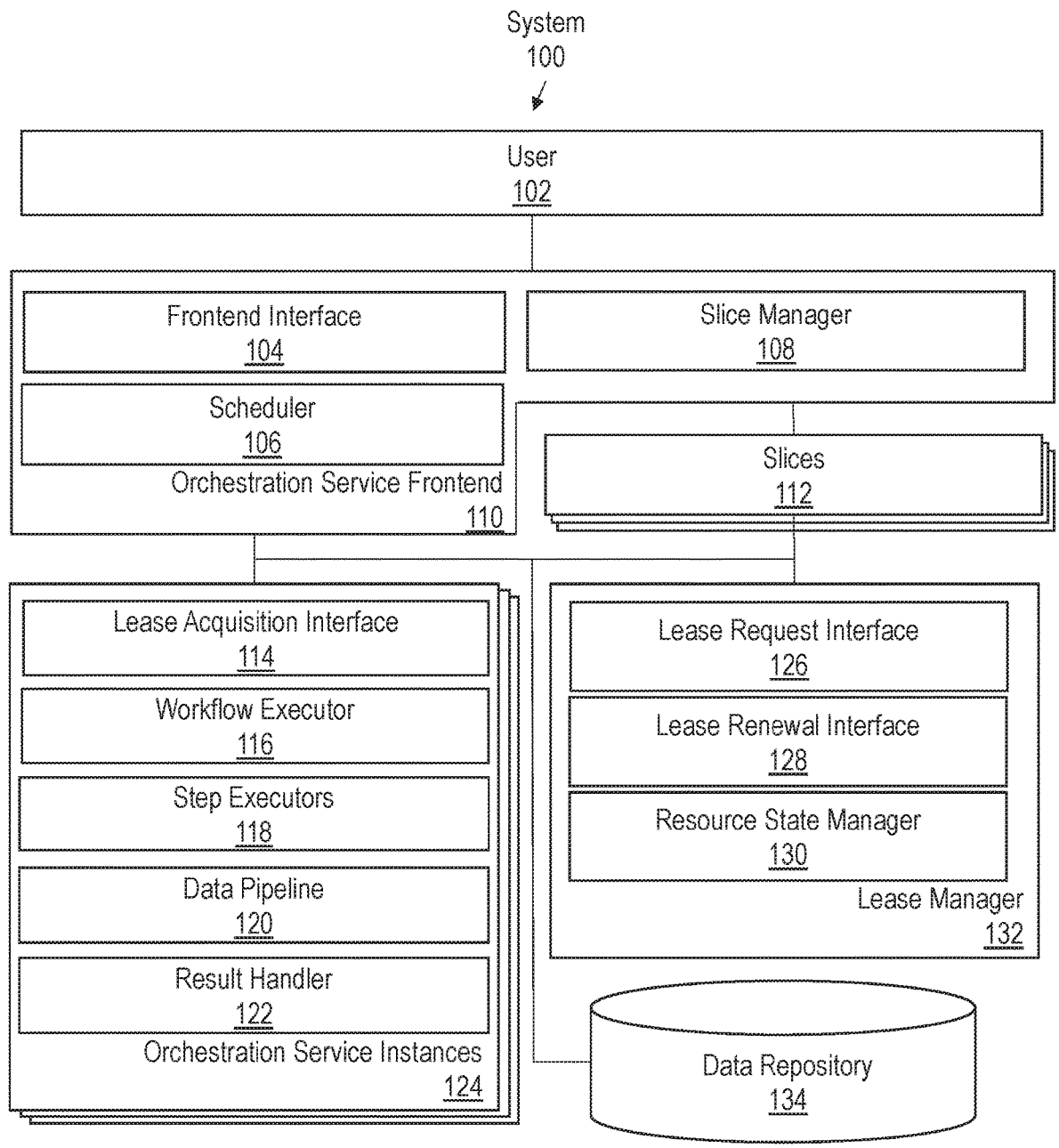
FIG. 1 illustrates a system for providing orchestration cloud services in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. LEASE-BASED SLICE ASSIGNMENT
   3.1 SLICES, RESOURCE GROUPS, OWNERS, AND LEASES
   3.2 SLICE ACQUISITION PHASES
   3.3 LEASE ACQUISITION AND ASSIGNMENT PROCESS
   3.4 LEASE RENEWALS AND DURATION
   3.5 LEASE NEGOTIATION AND BALANCING
   3.6 LOAD-BASED SCALING
4. RECOVERY OF RUNNING ORCHESTRATION OPERATIONS
   4.1 STATE AND CONTEXT RECOVERY FROM INSTANCE FAILURES
   4.2 MESSAGE QUEUE RESTORATION
   4.3 LEASE MANAGER FAILOVER
5. COMPUTER NETWORKS AND CLOUD NETWORKS
6. MICROSERVICE APPLICATIONS
7. HARDWARE OVERVIEW
8. MISCELLANEOUS; EXTENSIONS

1. General Overview

Techniques are described herein for providing highly available and scalable cloud services, including orchestration services. In one or more embodiments, executable workflows (also referred to herein as recipes) are partitioned or sharded across multiple leasing clients through a flexible lease-based allocation process. A leasing client, in this context, refers to a set of microservices or applications, such as an instance of an orchestration cloud service, configured for executing a set of workflows. During the lease-based allocation process, leasing clients request leases on one or more slices of execution. Once a leasing client has successfully acquired a lease, the leasing client may perform one or more workflow executions associated with the slice until the lease has expired. When the lease expires, the leasing client may renew the lease to continue handling the workflow executions associated with the slice or the slice may be relinquished and leased by other clients.

In one or more embodiments, a lease management service is configured to reassign a lease when relinquished by a leasing client or when the leasing client fails. After the lease duration has lapsed, the leasing management service may check the state of the leasing client that holds the lease. If the leasing client does not renew the lease, due to a failure or other circumstance, then the lease management service may reassign the lease to another leasing client.

In one or more embodiments, the lease management service is configured to balance slices between leasing clients. As new leasing clients are instantiated, the lease management service informs existing leasing clients about new leasing clients. All leasing clients participate in renegotiation and redistributing slice assignment for load balancing. Load balancing helps leasing clients from becoming overburdened with too many slices of execution. In the event that a leasing client fails, other leasing clients are available to resume the workflow executions where the failed leasing client stopped. The slices leased by a failed leasing client may be distributed across multiple other leasing clients to maintain a balanced distribution of slices.

In one or more embodiments, lease durations are configurable for different slices or groups of slices. Smaller lease durations allow for quicker load re-balancing, especially upon leasing client failures. Larger lease durations allow for more efficient resource usage in steady state without frequent renewals to maintain lease ownership.

In one or more embodiments, state and context information is maintained on a per-slice basis. If a leasing client fails or relinquishes a slice, then another leasing client may resume workflow executions from where the previous owner stopped based on the state and context information associated with the slice. Thus, duplicate workflow executions may be reduced or avoided, even in the presence of disasters.

In one or more embodiments, slices may be scaled up or down based on workload. For example, if the size of a slice exceeds a threshold, then the slice may be sub-divided by moving all or a portion of scheduled workflow executions to new slices. In addition, new workload may be added to the other slices. Once the new slices are generated, additional execution instances/leasing clients may be added to handle the increased workload. If the workload decreases, the leasing clients may rebalance slice ownership. Underutilized leasing clients may lose lease ownership and be decommissioned.

2. Architectural Overview

In one or more embodiments, the techniques described herein are implemented by an orchestration service. An orchestration service as used herein refers to an application or cloud service for performing orchestration operations. Example orchestration operations may include, but are not limited to, upgrading resources used to deliver a defined service, stitching together or otherwise configuring resources to deliver the defined service, deploying additional resources, and shutting down resources. A defined service may be a Platform-as-a-Service (PaaS), a database-as-a-service (DBaaS), software-as-a-service (SaaS), infrastructure-as-a-service (IaaS), or any other network-based service. Instances or an orchestration service (also referred to herein as "execution instances" or "leasing clients") may perform orchestration operations by applying patches, running scripts, and/or executing other program code. For example, an instance of an orchestration service may apply a patch to a database server that supports one or more tenants of a defined service.

FIG. 1 illustrates example system 100 for providing orchestration cloud services in accordance with one or more embodiments. As illustrated, system 100 includes orchestration service frontend 110, slices 112, orchestration service instances 124, lease manager 132, and data repository 134. The components illustrated in FIG. 1 are provided for purposes of explanation. However, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Orchestration service frontend 110 includes frontend interface 104, scheduler 106, and slice manager 108. Frontend interface 104 manages interactions between system 100 and user 102. A user in this context may be a human user, such as a system administrator, or another application/service. Frontend interface 104 may present or otherwise provide an interface through which workflow recipes may be composed or submitted for execution. For example, frontend interface 104 may provide a graphical user interface (GUI), a command-line interface (CLI), and/or an application programing interface (API) to user 102 through which a user may request execution of workflows, such as upgrades and other orchestration operations.

Workflow executions may be performed on-demand or at a scheduled time. If a workflow submission is on-demand, slice manager 108 assigns workflow executions associated with the workflow submission to one or more of slices 112. For scheduled submission, scheduler 106 provides a timer. In one or more embodiments, the timer is a countdown timer that triggers a message after a specified amount of time has lapsed. For example, user 102 may request that an orchestration operation be executed after a specified number of hours or days have passed. Additionally or alternatively, the timer may trigger the message at a specified date and time. In this scenario, user 102 may specify the specific date (e.g., day, month year), and time to begin execution of the workflow.

Slice manager 108 assigns workflow executions to slices 112 on demand or at scheduled execution times. In one or more embodiments, each slice is associated with a separate request queue. Slice manager 108 may enqueue messages and/or executable instructions in the request queue of the slice to which a workflow execution is assigned. For example, slice manager 108 may enqueue instructions for applying a patch to a software resource, such as a database, to one slice. Slice manager 108 may enqueue instructions for deploying an instance of an application in support of a cloud service to another slice. The instructions that are assigned to each slice may vary depending on incoming requests.

Slices 112 may include any resources involved in processing a workload, including hardware and software. Slices 112 may belong to resource groups. A resource group refers to a set of related resources, defined by a set of criteria, which may be arbitrary and user-defined. Example resource grouping criteria may include, but are not limited to, workflow priority, workflow ownership, and workflow resource types. Workflow ownership may be determined based on the tenant of a cloud service for which the workflow is being executed. Workflow resource type may be determined based on the type of resource on which the workflow is being executed. For example, a patch operation may target a database application, a middleware application, a frontend application, or some other type of software or hardware resource.

Orchestration service instances 124 (also referred to herein as execution instances or leasing clients) are a set of micro services or applications configured to execute workflows. An orchestration service instance includes lease acquisition interface 114, workflow executor 116, step executors 118, data pipeline 120, and result handler 122.

Lease acquisition interface 114 includes a set of one or APIs for acquiring and renewing leases on slices 112 from lease manager 132. Lease acquisition interface 114 may communicate with lease manager 132 using one or more communication protocols, such as those included in the Internet Protocol (IP) suite. For example, lease acquisition interface 114 may send messages formatted according to the Hypertext Transfer Protocol (HTTP).

In one or more embodiments, lease acquisition interface 114 is configured to request leases on slices. A lease request message may include slice identification data, such as the type of slice requested and/or the group to which the slice belongs. Additionally or alternatively, the lease request message may include a requested lease duration. For example, lease acquisition interface 114 may request a lease in terms of seconds, minutes, hours, or any other timeframe.

In one or more embodiments, lease acquisition interface 114 is configured to send lease renewal messages. A lease renewal message may be a low overhead ping message or any other message that indicates the orchestration service instance's intent to renew a lease on a slice.

Once a lease is acquired, an orchestration service instance may run the set of workflow executions associated with the slice. In one or more embodiments, workflow executor 116 is a micro service or application process that asynchronously consumes requests stored in a request queue associated with a slice. For a given workflow submission, workflow executor 116 may perform one or more of the following operations:

Perform metadata look up for topology-aware workflow executions that accounts for dependencies between different hardware and software components;

Split the execution for a particular workflow submission across multiple top-level workers, if appropriate and join all top-level workers to determine the final execution status of the entire execution;

Split step execution into multiple step-level workers if appropriate and join all step workers for a given step before proceeding to next step;

Trigger execution of all stages of a step such as preprocessing, post-processing, compensating actions for handling failures, and retries, which may use the timer of scheduler 106;

Prepare input values for variables and parameters declared in a workflow/recipe specification;

Consolidate output values and results, persisting these values in data repository 134; and/or Summarize execution statistics at various levels such as summaries for individual step-level workers, global steps consolidated across multiple step-level workers, individual top-level workers, and global workflow submissions consolidated across multiple top-level workers.

When execution of a workflow submissions is split across multiple top-level workers, each top-level work may operate in parallel and perform one or more of the tasks listed above. Each top-level worker may thus act as a step dispatcher that manages execution of steps for a different instance of the workflow.

Step executors 118 are microservices or applications processes that execute steps defined in workflow/recipe submission. There may be different step types, and each step type may be handled by a different type of step executor. Example types of step executors may include, but are not limited to, representational state transfer (REST) executors and entity executors.

REST executors are step executors that makes outbound connections to web services, such as Amazon Web Services (AWS), Microsoft Azure, Oracle Public Cloud, etc. REST executors may use proxy servers and retrieve any credentials used to make outbound REST calls to external cloud services. REST executors may be tuned to high network input/output (IO) processing using non-blocking IO for higher throughput and better resource utilization. REST executors may also handle various exceptions that may arise when invoking REST calls to a web service.

Entity executors are step executors that run on a directly accessible host, such as on a host inside a virtual private cloud or datacenter environment. Entity executors may resolve any credentials used to access a host and execute a step. Entity executors may run any host-based scripts against an entity, such as standard query language (SQL) scripts against a target database system.

In addition or as an alternative to REST and entity executors, other types of step executors may be deployed. For example, a compute executor may be deployed to execute arbitrary user functions. This type of executor may facilitate pre-processing, post-processing, value extraction, and consolidation.

Data pipeline 120 receives result data from each of the step executors. In one or more embodiments, data pipeline 120 is implemented as a file system that stores the step results in one or more datafiles. However, execution results may be stored in a queue or any other format, which may vary from implementation to implementation.

Result handler 122 is a process or set of processes that retrieve the execution results from data pipeline 120. Based on the results, result handler 122 may generate a set of outputs including, but not limited to:

Summarizations: Messages in a queue for a slice may correspond to one or more earlier messages. For example, a queue for a slice may include step completion messages for a particular step, which is associated with a corresponding step begin message. Once the completion message is received, a summarization may indicate the elapsed execution time of the step and the completion status of the request. Summarizations may further indicate whether a step is waiting on other steps. For, example a join operation may not be executed until step completion messages are received from a plurality of step-workers. Summary metrics may identify how many step-workers have completed for the step.

Values for output variables: A step may produce an output value for one or more variables. The values may be used in subsequent steps.

Execution contexts: A workflow execution may include a set of execution contexts. For example, the execution context may indicate the execution status (e.g., success, failure, pending) for step-level and top-level workers. The execution context may further include execution statistics, such as elapsed time, completion time, and retry iterations at different levels. Additionally or alternatively, an execution context may include REST response bodies from web service executions and/or output from host script executions.

In one or more embodiments, result handler 122 stores the set of outputs in an in-memory cache and/or queue associated with a slice. If the orchestration instance fails or relinquishes the slice, another orchestration instance may read the set of outputs from one or more in-memory caches, which may be distributed or reside on a single network host, to determine the current state of execution for workflow executions in the slice. For example, the orchestration instance may determine, from the execution context, the execution status for each step-level and top-level worker when the previous orchestration instance failed. The orchestration instance may further determine, from the summarization, whether a workflow execution is waiting Lease manager 132 is a set of one or more micro services or application processes that manages which orchestration service instances own leases on slices 112. Lease manager 132 includes lease request interface 126, lease renewal interface 128, and resource state manager 130.

Lease request interface 126 includes a set of one or more APIs for processing requests received from orchestration service instances 124 for leases on slices 112. Lease request interface 126 may grant or deny leases based on the current ownership state of the slices. For example, if another orchestration service instance already owns a lease, then lease request interface 126 may deny a request. Lease request interface 126 may act as an intermediary through which multiple orchestration service instances 124 negotiate for leases on slices. Example lease negotiations are provided in further detail below.

Lease renewal interface 128 includes a set of one or more APIs for processing lease renewal requests. In one or more embodiments, lease renewal interface 128 is configured to listen for a ping message from an owner of a slice. If the orchestration service instance that owns the slice does not send a ping message before the lease duration has lapsed, then lease renewal interface 128 may lease the slice to another orchestration service instance.

Resource state manager 130 maintains state information for leases. The state information may indicate what slices are available, what resource groups slices belong to, which orchestration service instance (if any) owns a lease on a slice, and which orchestration service instances are interested in a lease on a slice. Resource state manager 130 may update the state information based on lease request and lease renewal messages received from orchestration service instances 124, as described in further detail below.

Although only one lease manager 132 is depicted, multiple instances of the lease manager may be deployed. In one or more embodiments, multiple instances have a consistent view of the data, including the ownership state for the leases and the responses provided to requests from leasing clients. In this case, the response to a request for a lease does not depend on the lease manager instance to which the request is submitted. The request may bounce from one lease manager instance to another. Each lease manager instance has a consistent view of the state information and responds in the same manner. If one lease manager instance fails, requests may be routed to another lease management instance to continue lease operations.

Data repository 134 stores data used for orchestration and lease operations, such as the lease state information, slice messaging queues, in-memory caches, execution contexts, summarizations, values for output variables, topology metadata, and recovery data. Data repository 134 may be implemented as any type of storage unit and/or device (e.g., a file system, database, collection of tables, or any other storage mechanism) for storing data. Further, data repository 134 may include multiple different storage units and/or devices. The multiple different storage units and/or devices may or may not be of the same type or located at the same physical site. Further, data repository 134 may be implemented or may execute on the same computing system as one or more other components of system 100. Alternatively or additionally, data repository 134 may be implemented or executed on a computing system separate from the other components of system 100. Data repository 134 may be communicatively coupled to other components of system 100 via a direct connection or via a network. Data repository 134 may be implemented as an external cloud service or may be part of the same service as the orchestration service.

3. Lease-Based Slice Assignment

Lease manager 132 provides a stateful mechanism to store data representing a group of slices, owners (also referred to herein as leasing clients or execution instances), and leases by which the owners can claim ownership of the slices. Lease manager 132 further provides a timeout mechanism by which owners may be automatically declared dead if the owners do not renew the leases with lease manager 132 within a specified amount of time (referred to herein as the lease duration). These mechanisms allow a group of owners to collaborate and divide ownership.

The subsections below describe various embodiments for a lease-based allocation process. A summary of the subsections is provided as follows:

Subsection 3.1 describes defining relationships between slices, resource groups, owners and leases;

Subsection 3.2 describes example phases or states that leasing clients may undergo;

Subsection 3.3 describes example processes for acquiring and assigning a lease;

Subsection 3.4 describes example processes for renewing a lease and setting a lease duration;

Subsection 3.5 describes example processes for negotiating leases and balancing slices between multiple leasing clients; and Subsection 3.6 describes scaling slices and execution instances based on workload.

3.1 Slices, Resource Groups, Owners, and Leases

A slice refers to any resource, including hardware and software, involved in processing a workload. For an orchestration service, a slice may refer to a set of workflow executions. For example, a slice may include a set of workflow executions for applying a patch on a resource, stopping a resource, bringing a resource online, or performing other orchestration operations.

Additionally or alternatively, slices may refer to resources outside the context of orchestration services. For example, a slice may include a set of workflow executions for performing application logic or implementing a web service. In the context of a search web service, for instance, a slice may include executions for retrieving a set of search results or indexing a set of web sites.

A resource group refers to a set of related slices. In one or more embodiments, resource groups are defined by an arbitrary set of criteria, which may be user-defined. For example, a user may select or define a set of characteristics for organizing slices. Slices that share the same set of characteristics may be placed in the same group, while slices that have different characteristics may be separated. In addition or as an alternative to user-defined characteristics, a default set of characteristics may be automatically selected to organize the slices. The default or user-defined set of characteristics used to group slices may vary from one application to the next. Example characteristics are provided below.

In one or more embodiments, slices are grouped based on priority. Certain workflow operation may have higher priority than others. For example, a patch to address a security violation may be classified as high priority since a failure to efficiently correct the violation have a severe impact on the performance and stability of a cloud service. A routine lifecycle operation may be given lower priority since the performance implications are less severe. Slices that include a set of executions classified as high priority, such as patches for addressing security violations, may be grouped together. Lower priority slices may be placed into separate buckets.

In one or more embodiments, slices are organized based on ownership. A cloud service may be accessed by several different tenants that own accounts with the service. Some workflow operations may be performed on behalf of a particular tenant or on a tenant-owned resource. For example, a set of tenants may have requested more storage and/or other resources. Workflow executions for scaling out the service for different tenants may be assigned to different slices. Slices may then be grouped separately by tenant identifiers, where slices including workflow executions for the same tenant may be assigned to the same resource group.

In one or more embodiments, slices are grouped based on what resource or resource type is targeted. For example, slices that include operations on a particular database or set of databases may be assigned to one resource group, slices that include operations on a middleware application or set of middleware applications another resource group, and slices that include operations on a web server or set of web servers another resource group.

In one or more embodiments, slices are grouped based on the type of workflow executions assigned to each slice. Example execution types and corresponding resource groups may include:

Ephemeral jobs: This resource group includes slices with a set of parallel single-step workflow executions without persistent tracking;

Auto-remediation actions: This resource group includes slices with workflow executions that have stringent latency requirements such as correcting security violations; and Lifecycle management operations: This resource group includes slices with complex multi-step workflow executions to manage and maintain a system or set of systems, such as migrating an on-premise database to a cloud service.

Additionally or alternatively, other resource groups may be defined based on other characteristics previously mentioned and/or any other characteristic associated with the workflow executions.

The number of resource groups that are defined may vary from implementation to implementation. In some cases, no resource groups may be defined, and all slices may be treated equally. Alternatively, two or more resource groups may be defined, and slices may be allocated based on the defined groups. For example, ephemeral workflow executions may be assigned to a first set of one or more slices, auto-remediation workflow executions may be assigned to a second set of one or more slices, and lifecycle management operations may be assigned to a third set of one or more slices.

An owner or leasing client refers to any computing or processing unit that has or is interest in having exclusive ownership on a slice. Example owners may include, but are not limited to:

A set of micro-services for executing workflows;

A virtual machine;

A web application; and

A database.

Leases represent a contract between an owner and a slice for a specified duration. An owner may have zero or more leases. If an owner does not renew the lease before the lease duration lapses, then the lease may be transferred/reassigned to another owner.

Figure 2:
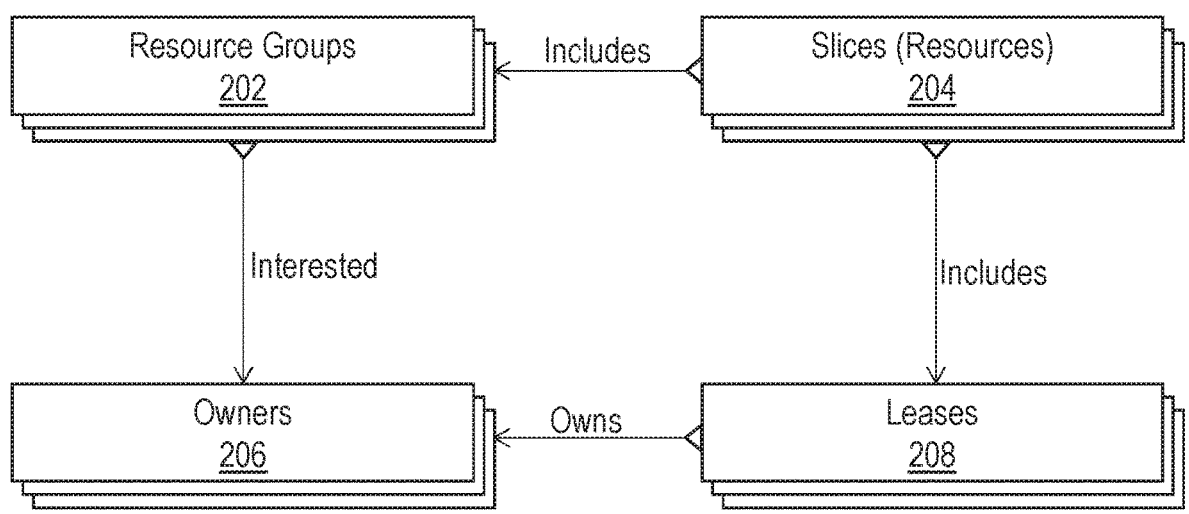
FIG. 2 illustrates an example set of connections between slices, resource groups, leases, and owners in accordance with one or more embodiments.

FIG. 2 illustrates an example set of connections between slices, resource groups, leases, and owners in accordance with one or more embodiments. Resource groups 202 include a set of slices 204. Owners 206 indicate an interest in slices that belong to one or more resource groups. An owner may own one or more of leases 208. A lease may include a contract on one or more of slices 204.

In one or more embodiments, data defining resource groups 202 and slices 204 are persistently stored such that the data is available even in the presence of lease manager failures. The data identifying owners 206 and leases 208 may be ephemeral and deleted when an owner is not available or is otherwise unreachable when the lease expires. In this case, new leases may be assigned to other owners.

In one or more embodiments, each operation and step in a workflow is executed once and only once. Duplicate executions reduce efficiency and, in some cases, may lead to unintended side effects. To prevent duplicate executions, different slices may be restricted from including overlapping workflow executions. A single slice may also be restricted to being leased by one owner at a time.

3.2 Slice Acquisition Phases

Figure 3:
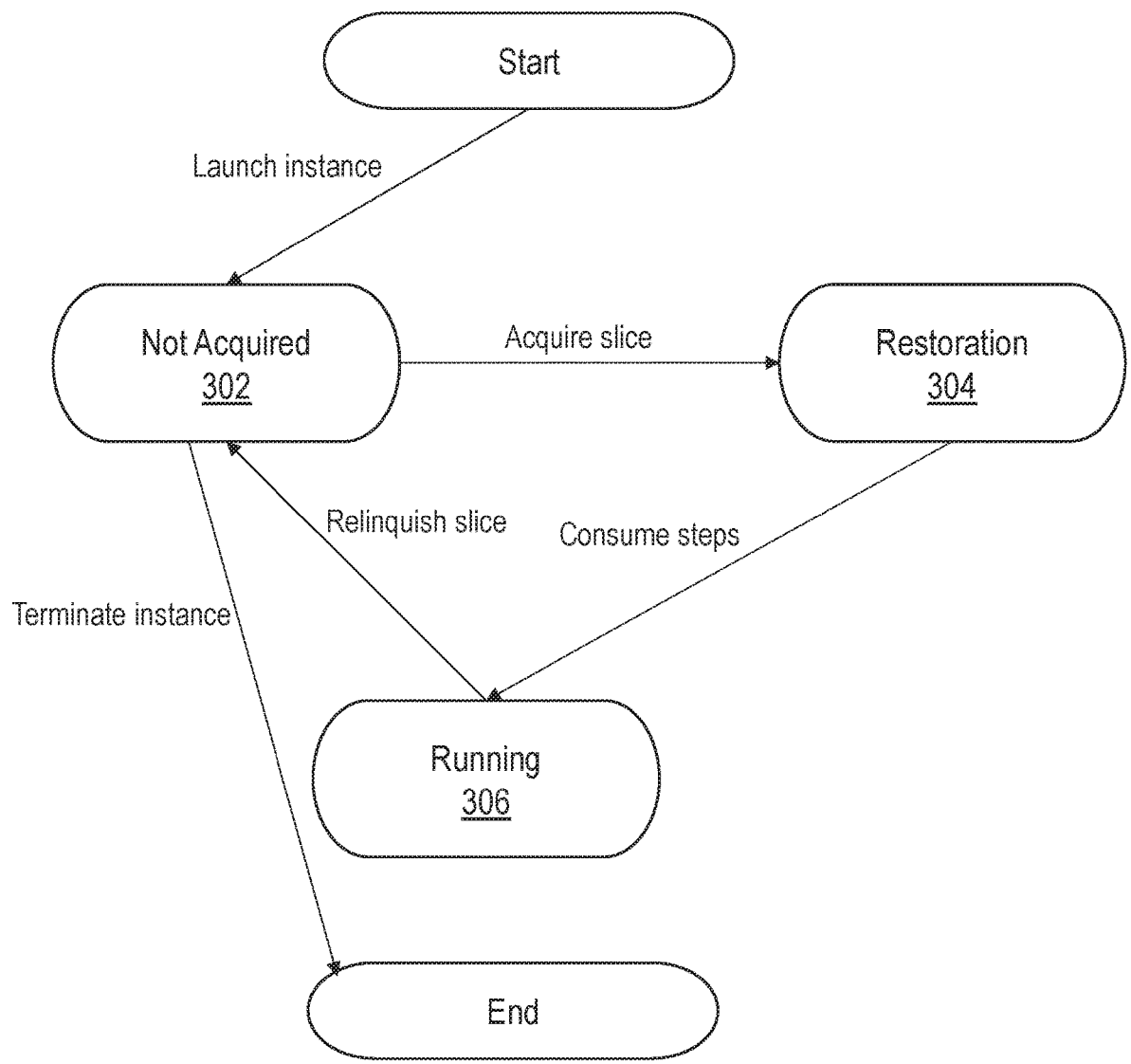
FIG. 3 illustrates an example set of slice acquisition phases in accordance with one or more embodiments.

Leasing clients may be brought online and shutdown at any time during workflow operations. Each leasing client may pass through various slice acquisition phases during the leasing client's lifecycle. FIG. 3 illustrates an example set of slice acquisition phases in accordance with one or more embodiments.

A leasing client/execution instance that is newly launched begins in not acquired phase 302. The leasing client may then send one or more messages to a lease manager instance requesting a slice. A lease request may target a particular slice or a particular resource group. For example, a leasing request may request a slice on a particular high priority slice or on any slice that belongs to the high priority group. In other cases, a generic lease request may be sent, and the lease manager may be responsible for selecting the slice and resource group.

Once a lease on an available slice has been granted by the lease manager, the leasing client transitions to restoration phase 304. In this phase, leasing client may determine whether to perform any restoration operations to prepare for running the workflow executions associated with the slice. Example restoration operations are described in further detail in Section 4 below. Restoration operation may be performed to restore messaging queue, execution context, and/or other state information that resulted from failure of a previous owner or other resource.

Once restoration phase 304 is complete, the leasing client transitions to running phase 306. In this phase, the leasing client runs the set of workflow executions associated with the slice. For example, the leasing client may instantiate one or more top-level workers and/or one or more step-level workers to perform orchestration operations such as previously described.

When in running phase 306, the leasing client may transition back to not acquired phase 302 by relinquishing the slice, which may occur during load balancing operations or if the leasing client fails. Once back up and running, the leasing client may then acquire a new lease on a slice and transition once again through slice acquisition phase. Alternatively, the leasing client may be decommissioned or terminated. In this case, the processes associated with the leasing client may be stopped or left in an idle state.

3.3 Lease Acquisition and Assignment Process

In one or more embodiments, leasing clients execute a lease acquisition process to acquire one or more leases on one or more slices. During the lease acquisition process, a leasing client sends one or more messages to an instance of lease manager 132. If a lease is available, then the instance of lease manager 132 generate a lease on the slice for the leasing client. The lease is associated with a specified duration during which the lease remains valid. The leasing client has the option of renewing the lease before the lease expires or may relinquish the lease at the end of the lease duration.

In one or more embodiments, a lease request message specifies one or more characteristics of slice that the leasing client is attempting to acquire. For example, the messages may specify a resource group from which the leasing client is attempting to acquire a slice. If a slice that satisfies the leasing criteria (e.g., is assigned to the requested resource group) is available, then lease manager 132 may return a lease on the slice.

In one or more embodiments, a lease manager is configured to return state information to the leasing client during the lease acquisition process. The state information may identify the owners that are currently active, if any, the slices/resource groups owners are currently interested in, the slices that are available to lease, if any, and the owners of each active lease. The state information may be returned as part of an alive ping and/or in response to a request to lease a slice.

Figure 4A:
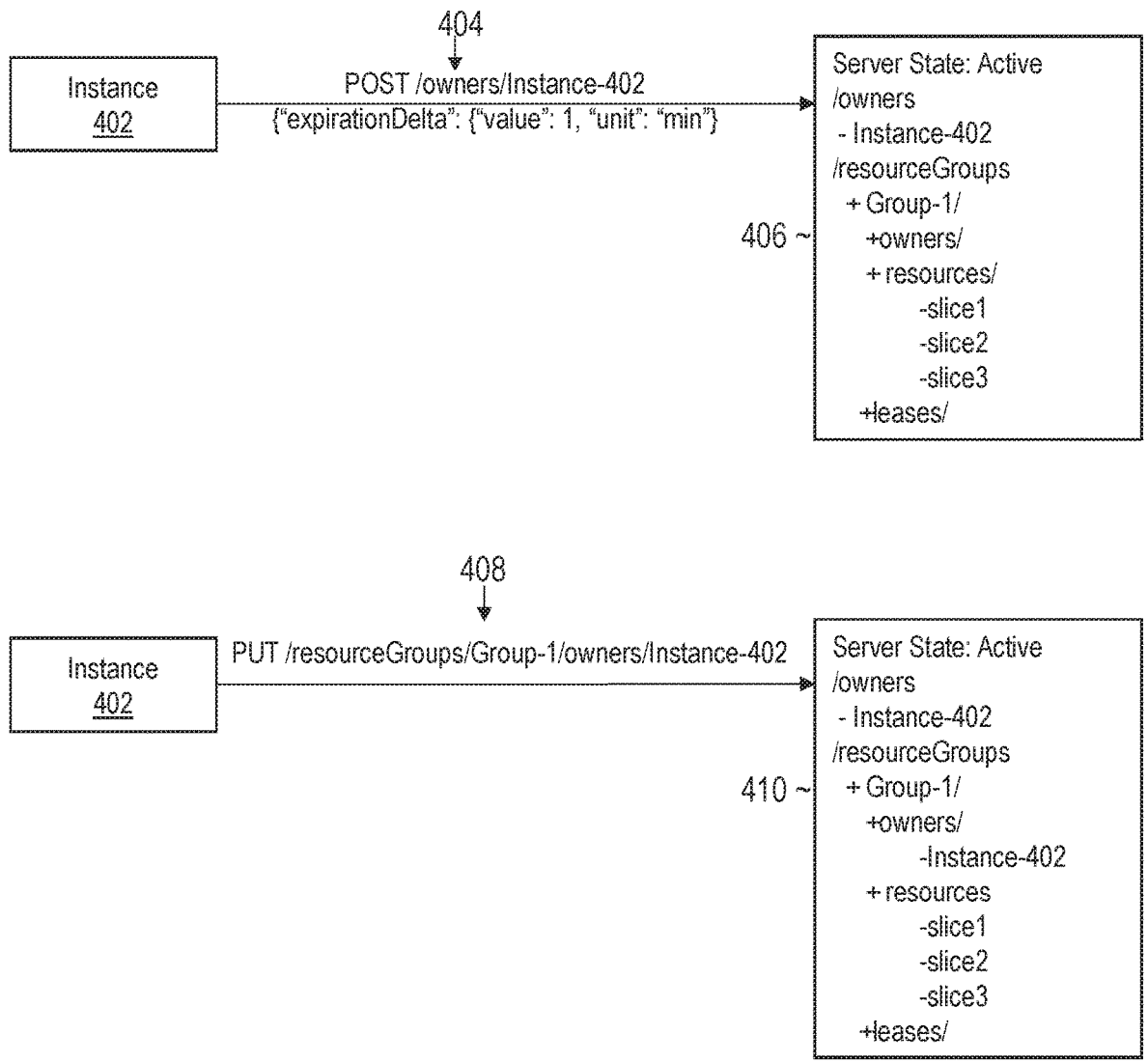
FIG. 4A illustrates an example set of messages and lease manager states during a lease acquisition process whereby a leasing client requests a lease on a slice in accordance with one or more embodiments.

FIG. 4A illustrates an example set of messages and lease manager states during a lease acquisition process whereby a leasing client requests a lease on a slice in accordance with one or more embodiments. The leasing client in the example depicted is an instance 402. At the start of the lease acquisition process, instance 402 sends POST message 404, which includes an owner identifier (Instance-402) and a requested lease duration (1 minute). In response, an instance of lease manager 132 updates state information by adding the owner identifier to a global list of owners. The resulting state information is depicted in window 406. As can be seen, the element/owners in the state information stores the owner identifier Instance-402, thereby indicating that instance 402 is active and interested in acquiring a slice.

Instance 402 next sends PUT message 408 that identifies a resource group (Group-1) from which a slice is requested. In response, the instance of lease manager 132 updates the state information as depicted in window 410. As can be seen, the owner identifier Instance-402 is added to the element/ resourceGroups/Group-1/owners/, thereby indicating the instance 402 has requested a lease on a slice from the resource group Group-1.

Figure 4B:
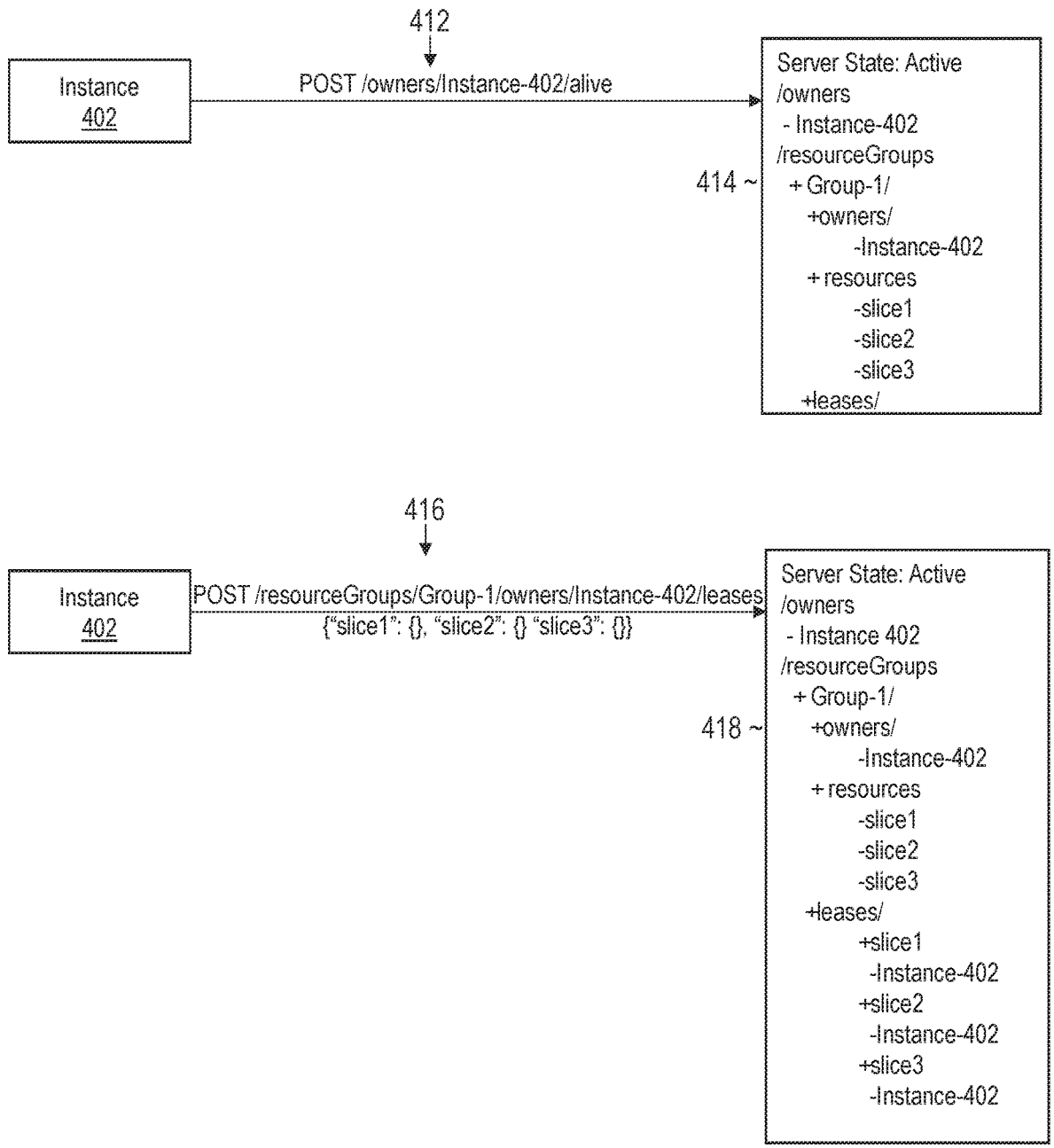
FIG. 4B illustrates an example set of messages and lease manager states for granting a lease to a leasing client in accordance with one or more embodiments.

FIG. 4B illustrates an example set of messages and lease manager states for granting a lease to a leasing client in accordance with one or more embodiments. The set of messages may continue sequentially from the messages depicted in FIG. 4A. Referring to FIG. 4B, instance 402 sends alive ping message 412 to the instance of lease manager 132. The state information is not changed in response to the alive ping message. The state information is depicted in window 414.

In response to the ping message, the instance of lease manager may send a return message (not depicted) that includes the state information. The return message may include all or a portion of the state information depicted in window 414. Upon receiving the message, instance 402 may determine that the slices slice1, slice2, and slice3 are available to be leased from the resource group Group1 because none of these slices are included in a listing of the active leases. In this example, there are no active leases for Group1 as reflected by the element /resourceGroups/Group-1/ leases/.

Instance 402 next sends POST message 416 to acquire leases on slice1, slice2, and slice3. In response, an instance of lease manager 132 generates leases on the slices and updates the state information. As can be seen in window 418, the state information lists Instance-402 as the owner of the leases on slice1, slice2, and slice3. Instance 402 may then proceed to the restoration phase and running phase for each of these slices, as previously described. Workflow executions for the different slices may be executed in parallel by different top-level and step-worker processes that are associated with the leasing client.

3.4 Lease Renewals and Duration

In one or more embodiments, a leasing client that owns a lease on a slice has an option to periodically renew the lease. An owner may renew the lease by sending a ping message, such as alive ping message 412, before the lease lapses. An instance of lease manager 132 may optionally send a request for a ping message before the lease duration has expired. If the owner does not ping within the specified time, then lease manager 132 may declare the owner dead and remove all slices/leases from the owner. For example, if Instance 402 fails to renew the lease on slice1, slice2, and slice3, then the state information may return from the state depicted in window 418 to the state depicted in window 406 by removing the leases and the owner identifiers. The slices may then be leased to other owners according to the lease acquisition process previously described.

In one or more embodiments, the owners set a ping timeout value during the lease acquisition process. The ping timeout value may act as the lease duration on slices owned by the owner. For example, if an owner sets a ping timeout value of two minutes, then the owner may hold an active lease on a slice for two minutes. The owner may renew the lease for another two minutes by sending a ping message before the two minutes has lapsed. The lease duration may vary from one owner to the next based on the ping timeout value set by each owner. The lease duration may be set in terms of physical time (e.g., seconds, minutes, days, etc.) or logical time, such as a system change number.

As an alternative to having owners set the lease duration, lease manager 132 may instead assume the responsibility. Lease manager 132 may configure the lease duration for individual slices and/or for resource groups. For example, high priority slices may be assigned shorter lease durations to maintain a frequent heartbeat on high priority operations and ensure that any failed owners are quickly replaced. Lower priority slices may be assigned longer lease durations to allow for more efficient resource usage in steady state operations by the owner. The lease duration may be selected in any other manner based on the type and/or other characteristics of the slices and workflow executions included therein.

The lease duration for different resource groups may be exposed to and configurable by an end user by lease manager 132). For example, a user may input, via a GUI or other interface, a specified lease duration Additionally or alternatively, lease manager 132 may automatically select lease duration values for slices and/or resource groups. Lease manager 132 may assign default values for the lease duration or may tune the values to balance between maintaining a heartbeat and reducing ping messages. As the likelihood of failed owners goes down, the lease duration may be increased. Conversely, the lease duration may be decreased to maintain a more frequent heartbeat when the likelihood of failed owners increases.

The lease manager may maintain different timers for different leases. In an example scenario:

Leasing client instance1 may be granted a lease on slice s1 at time t1 for lease duration p1;
Leasing client instance2 may be granted a lease on slice s2 at time t1 for lease duration p2; and
Leasing client instance3 may be granted a lease on slice s3 at time t2 for lease duration p1.

In the above scenario, lease manager 132 tracks the timeout deadlines for each of the different leasing clients. Leasing clients instance1 and instance2 are granted leases at the same time; however, the lease duration is different. Therefore, the leases lapse at different times, and the deadline for renewal differs between the two clients. Leasing client instance3 is granted a lease at a separate time with the same duration as the lease granted to instance1. Therefore, the deadline for renewal also differs between instance1 and instance3. The deadline may be the same or different for instance2 and instance3 depending on the start times (t1 and t2) of the leases and the lease durations (p2 and p1).

3.5 Lease Negotiation and Balancing

In one or more embodiments, multiple leasing clients are configured to negotiate and balance ownership of slices. If a new leasing client is instantiated and requests a slice, then another leasing client may relinquish one or more slices. The new leasing client may then acquire one or more of the relinquished slices. Once acquired, the new leasing client may begin running workflow executions that were not previously completed by the previous owner.

In one or more embodiments, leasing clients use lease manager 132 as an intermediary to negotiate slice ownership. When a leasing client requests a lease on a slice, lease manager 132 may update the state information to reflect the leasing client's interest in the slice. Other leasing clients may periodically check the state information to detect the other leasing client's interest. In response, one or more of the leasing clients may send a message to an instance of lease manager 132 to relinquish ownership of one or more slices. Lease manager 132 may then update the state information to indicate that the one or more slices are available.

In one or more embodiments, leasing clients are configured to check for changes in the state information during lease renewals. For example, in response to receiving a ping message, an instance of lease manager 132 may return the state information that is maintained. The leasing client receiving the state information may analyze the list of owners to determine if there are any changes. If a new owner has been added and/or a previous owner is no longer active, then the slice ownership may be rebalanced. For example, the leasing client may relinquish one or more slices if a new owner is detected. In the event that an owner is no longer active, the leasing client may assume ownership of one or more of the owner's slices, if available.

In one or more embodiments, lease manager 132 is configured to return a hash code that represents the shape of owners, slices, and leases within a resource group. To generate the hash code, lease manager 132 may apply a hash function to one or more values derived from the state information maintained for a resource group. For example, a hash code for the state information depicted in window 418 for the resource group Group-1 may be generated by hashing the string value Group-1/+owners/-Instance402/+re-sources/-slice1/-slice2/-slice3/+leases/+slice1/-Instance-402/+slice2/-Instance-402/+slice3/-Instance-402. The hash code may be returned in response to a request or an alive ping message received from a leasing client.

In one or more embodiments, a leasing client is configured to compare hash codes received from leasing manager 132. If the most recent hash code does not match the previously received hash code, then the leasing client may detect a change in the shape of the owners, slice, and leases, within the resource group. The leasing client may then fetch the list of current owners and current lease assignments from leasing manager 132 and attempt to rebalance its leases based on the updated state information. For example, the leasing client may release one or more leases if more owners join or request one or more leases if fewer owners are present with respect to the relevant resource groups.

Figure 5A:
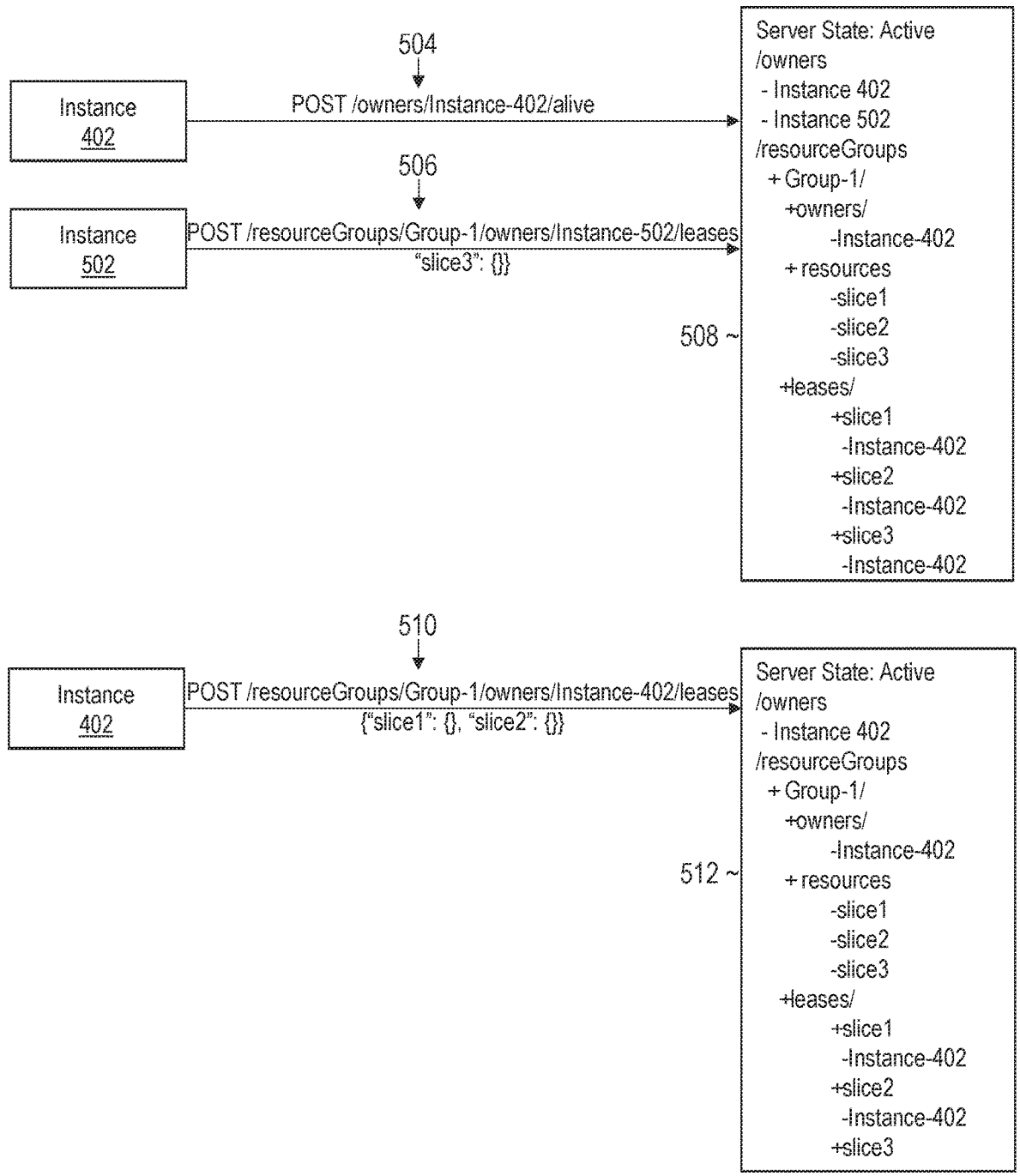
FIG. 5A illustrates a first set of messages and lease manager states for negotiating and balancing a lease ownership between multiple clients in accordance with one or more embodiments.
Figure 5B:
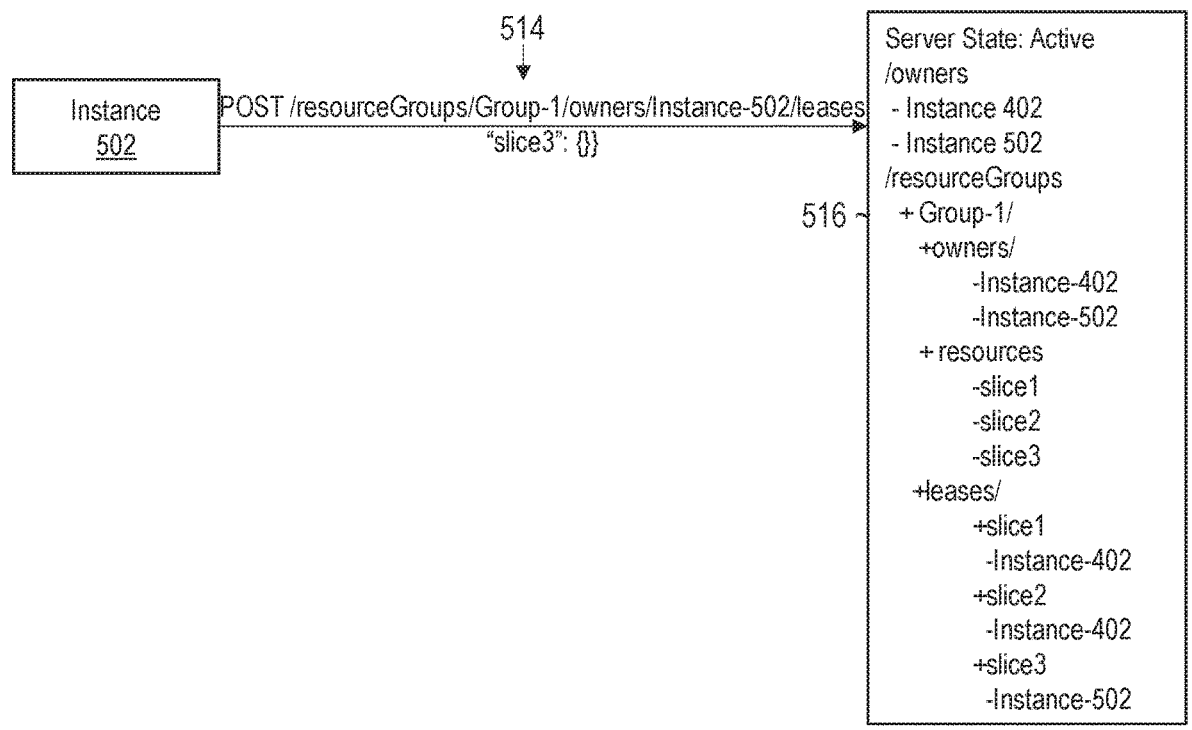
FIG. 5B illustrates a second set of messages and lease manager states for negotiating and balancing a lease ownership between multiple clients in accordance with one or more embodiments.

FIGS. 5A and 5B illustrates an example set of messages and lease manager states for negotiating and balancing a lease ownership between multiple clients in accordance with one or more embodiments. In this example, Instance 502 has become an available/interested owner as reflected by the state information in window 506. Instance 402 sends alive ping message 504 to an instance of lease manager 132. In response, a hash code may be generated and returned to instance 402. Instance 402 may compare the hash code with the previously received hash code to detect a change. Instance 402 may fetch the list of owners and parse the list to determine that instance 502 has joined.

Around or shortly after the time of alive ping message 504, instance 502 sends POST message 506 requesting a lease on slice3. However, this slice is still owned by instance 402. Therefore, the lease request is denied.

Responsive to detecting that instance 502 has joined as an owner, instance 402 renews leases sends POST message 510 to release the lease on slice3 and renew the lease on slice1 and slice2. Lease manager 132 updates the state information to remove the lease on slice3, thereby indicating that the slice is available. The resulting state information is depicted in window 512.

Referring to FIG. 5B, instance 502 next sends POST message 514 to request a lease on slice3. As the slice is now available, this lease request is successfully fulfilled. The resulting state information is depicted in window 516. The lease identifier Instance-502 is added to the element/resourceGroups/Group-1/leases/slice3 to reflect the new ownership of the slice. Instance 502 may proceed to the restoration and running slice acquisition phases for this slice, running workflow executions that were not previously completed by instance 402.

The manner in which slices are balanced between multiple clients may vary from implementation to implementation. In one or more embodiments, slices are distributed to evenly distribute the number of slices. For example, if there are three leasing clients and six slices associated with a resource group, then each of the three leasing clients may be acquire leases on two slices through the negotiation process. That is, leasing clients that start with more than two leases may release leases as the other leasing clients join. The new leasing clients may then acquire the leases and assume responsibility for the workflow executions included in the leased slices.

In other embodiments, slices may be assigned or otherwise associated with a weight. A weigh value for a slice may be determined as a function of the number of workflow executions and/or the type of workflow executions in the slice. Slices that reflect a greater amount of workload (e.g., a higher number of workflow executions, more resource-intensive workflow executions) may be assigned a higher weight. During the negotiation process, slices may be allocated to distribute the weight as evenly as possible. For example, if there are four slices and weight is not factored in, then two leasing clients may each have leases on two of the four slices. However, if one of the four slices is more heavily weighted than the cumulative weight of the other three slices, then the heavily weighted slice may be assigned to one leasing client, and the other three slices may be assigned to the other.

3.6 Load-Based Scaling

In one or more embodiments, the number of leasing clients and/or slices is adjusted during runtime based on load. If a slice represents a growing portion of the overall workload (e.g., the weight or size exceeds a threshold), the slice may be sub-divided by moving scheduled workflow executions into different slices. In addition, new workload submissions may be added to other slices. When new slices are created, additional orchestration service instances may be added as leasing clients/owners to handle the increased workload. Additionally or alternatively, the leasing clients may rebalance ownership of the slices through the negotiation process previously described.

Leasing clients may also rebalance the ownership of slices when the workload decreases. For example, if the size or weight of one or more slices becomes smaller than a threshold, then one or more slices may be reassigned to more evenly distribute the weight. Slices and leasing clients may also be decommissioned and removed to conserve resources.

4. Recovery of Running Orchestration Operations

In one or more embodiments, system 100 allows for various software and/or hardware components to fail without significantly impacting orchestration operations. For example, orchestration services instances, messaging queues, and/or instances of lease manager 132 may fail while one or more orchestration operations are being run. The failover provisions described further below allow for new and/or existing instances to efficiently resume operations with little to no duplication of workflow executions. Further the failover provisions allow the operations to continue with little to no downtime.

The subsections below describe various embodiments for recovering from different types of failures within system 100. A brief description of the subsections is provided as follows:

Subsection 4.1 describes techniques for recovering from failures of orchestration service instances;

Subsection 4.2 describes techniques for recovering message queues; and

Subsection 4.3 describes techniques for recovering from lease manager failures.

4.1 State and Context Recovery from Instance Failures

In the event that an orchestration service instance fails, slices ownership may be rebalanced, according to one or more embodiments. For example, if three separate orchestration service instances own two slices each, and one of the orchestration service instances fails, then each of the surviving orchestration instances may acquire one of the slices from the failed orchestration instance. If the failed orchestration service instance comes back online or another orchestration service instance joins, then slice ownership may again be rebalanced to return one slice from each of the surviving instances. Rebalancing slice ownership minimizes performance degradation of workflow executions during failures as the load may be shared and re-balanced across multiple orchestration instances.

Figure 6:
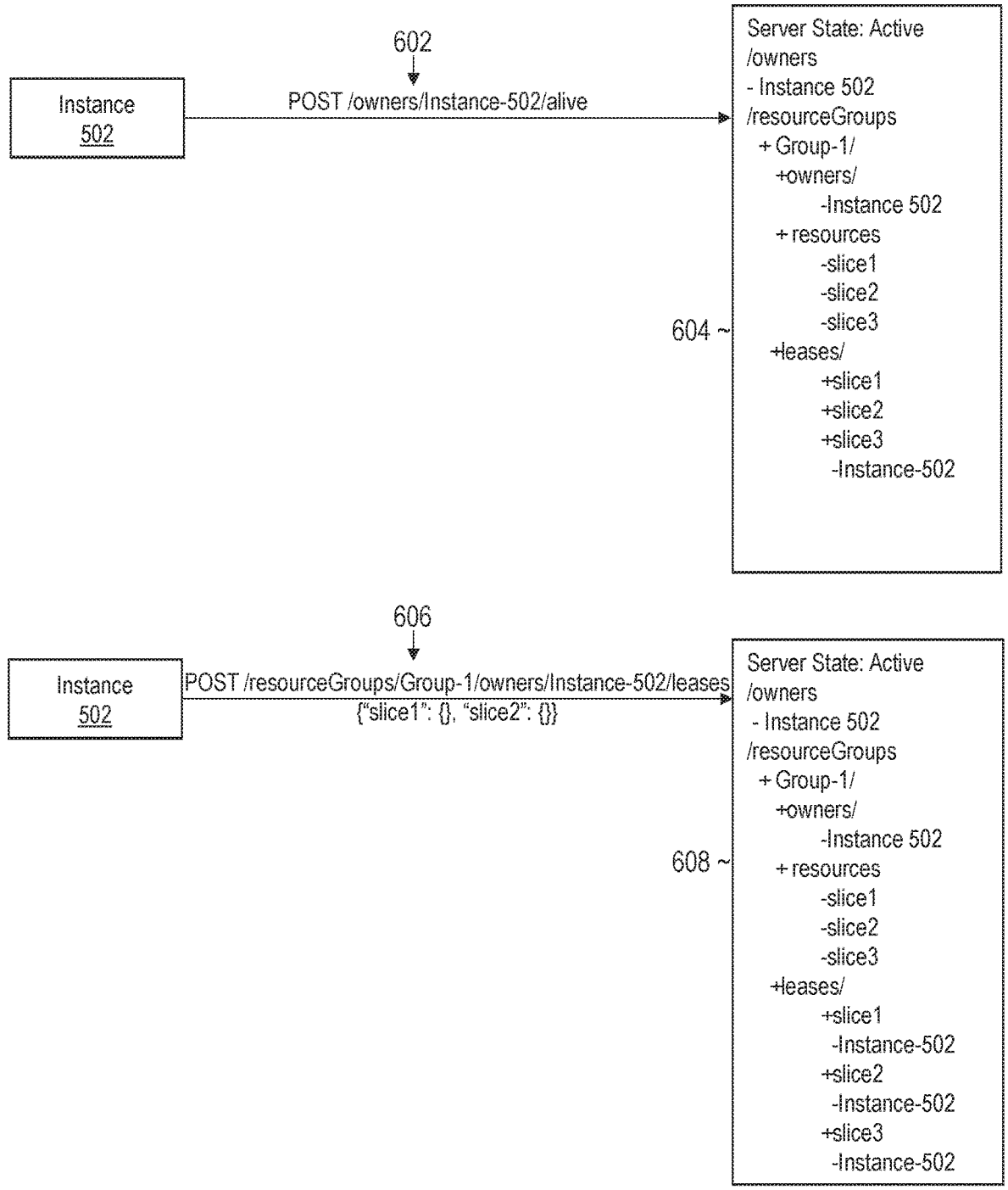
FIG. 6 illustrates an example set of messages and lease manager states for rebalancing slice ownership when an owner fails in accordance with one or more embodiments.

FIG. 6 illustrates an example set of messages and lease manager states for rebalancing slice ownership when an owner fails in accordance with one or more embodiments. The messages and state information may follow sequentially from those depicted in FIGS. 5A and 5B. In the example depicted in FIG. 6, instance 402 has failed to send an alive ping message by the ping timeout deadline. In response, lease manager 132 removes all references of instance 402 from the state information, which is reflected in window 604.

In the example illustrated in FIG. 6, instance 502 sends alive ping message 602 to an instance of lease manager 132. In response, lease manager 132 returns a hash code. Instance 502 compares the hash code with the previous hash code and detects a change. Instance 502 then fetches the list of owners and leases from the state information and parses the list to determine that instance 402 has died and that slice1 and slice2 are available.

Instance 502 next sends POST message 606 whereby the lease on slice3 is renewed and new leases on slice1 and slice2 are acquired. Thus, instance 502 has assumed responsibility for the two slices of failed instance 402 in addition to slice3, which was already owned by instance 502. The resulting state information is depicted in window 608. The leases on slice1 and slice2 may be reassigned to instance 402 when instance 402 rejoins the cluster of orchestration service instances.

In one or more embodiments, state and context data, collectively referred to as recovery data, is stored and organized on a per-slice basis. For example, there may be separate queues and/or in-memory caches for different slices in system 100. Each queue or cache may store summarizations, execution contexts, and output variable values. When the slice is reassigned to a leasing client, the leasing client may access the recovery data stored for the slice to determine, from the summarization and execution contexts, which steps were completed by the previous owner. The slice may further access output variable values, if any, that are involved in downstream workflow executions that were not completed by the previous owner.

In one or more embodiments, orchestration service instances are configured to periodically execute a checkpointing process. The checkpoint process writes the in-memory state as a snapshot into an object storage or storage cluster. The checkpoint may include data regarding the current state of execution of workflows in a slice. For example, the checkpoint may record the current consumed offset with respect to the queue, where the current consumed offset indicates a position in the queue where all previous messages and corresponding workflow executions have been consumed/run. The consumed offset checkpoint helps minimize restart time and limits how far back in the queue messages are reprocessed by a new owner.

Figure 7A:
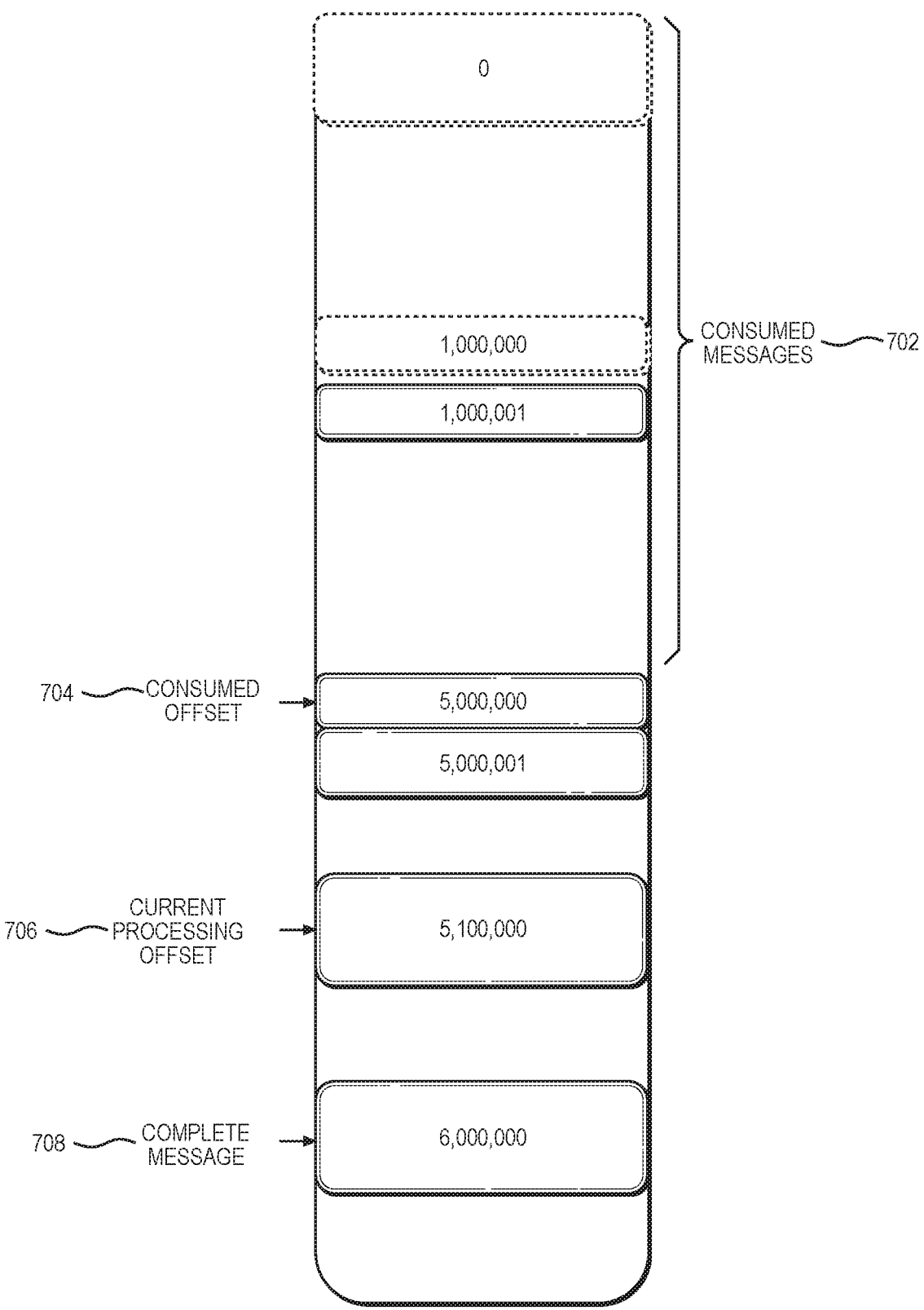
FIG. 7A illustrates an example set of state and context information maintained for an orchestration operation in accordance with one or more embodiments.

FIG. 7A illustrates an example set of state and context information maintained for an orchestration operation in accordance with one or more embodiments. Consumed offset 704 marks the position in the queue where all previous messages are guaranteed to be consumed. A new owner of a slice may thus skip processing consumed messages 702. Current processing offset 706 indicates the message that the leasing client is currently processing. Messages may be added to the queue subsequent to the current processing offset. For example, a step-worker may add completion message 708 while the leasing client is currently processing the workflow execution at current processing offset.

In one or more embodiments, execution contexts that are stored within in-memory caches are periodically snapshotted to a persistent medium. One approach is to include complex tree structures that store variables and corresponding values as part of the checkpoint. However, the reconstruction of complex tree maps from a snapshot may be costly due to the deep object structure nature of multi-step workflows. A separate approach is to use a database or similar structured data store to persist the tree structures as metrics. These metrics are stored separately from the snapshot and may be used to reconstruct the in-memory state in the event that snapshots are missing, corrupted, or not available. This dual recovery approach allows for robust recovery and minimizes duplicated executions, even in the presence of disasters or human errors. For any tree structures, the database may be queried on demand and the metrics may be used to reconstruct the tree structure in memory.

In one or more embodiments, the execution context is an append only structure that has a map of name value pair variables organized as a tree map within the database. A tree map may be generated by taking all variables belonging to a level and storing the set of variable for the level in its entirety. The variables may then be loaded for later use. A set of tree maps may be generated, with each tree map representing a different level. An in-memory cache may be rebuilt by reconstructing the variables according to the tree structure represented by a set of tree maps.

Figure 7B:
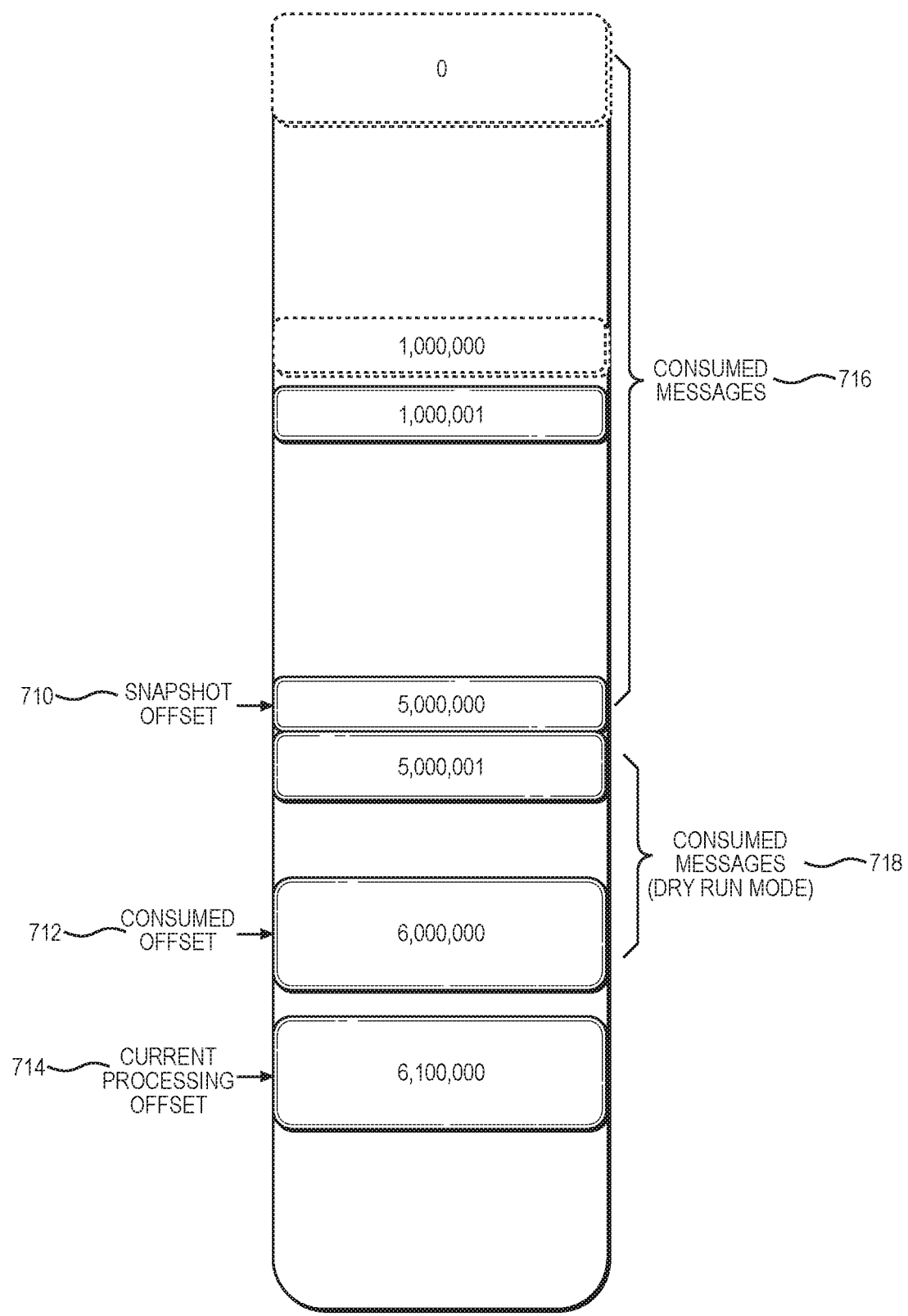
FIG. 7B illustrates an example set of state and context information that is backed up during a checkpoint in accordance with one or more embodiments.

In one or more embodiments, the set of tree maps may be used to reconstruct an in-memory cache or queue in a dry run mode. A dry run mode in this context refers to a mode in which messages are processed but not executed. The dry run mode may be useful to reconstruct operations that happened in between snapshot windows. Since the snapshot happens periodically (e.g., once every 15 minutes), one or more operations may occur between two different snapshot times. For example, FIG. 7B illustrates snapshot offset 710, corresponding to the consumed offset at the last checkpoint (i.e., when the last snapshot was taken). Current consumed offset 712 represents the most recent consumed offset, and current processing offset 714 represents the message that the leasing client is currently processing. In the event of a crash, consumed messages 716 do not need to be read or otherwise processed on restart. A snapshot was not taken, however, for consumed message 718. In dry run mode, these messages may be replayed without actual executions.

4.2 Message Queue Restoration

In one or more embodiments, system 100 is configured to backup a continuous stream of messages that are stored in queues associated with the slices. In the event of a disaster or failure, the queues may be restored from the backups. As queues may be completely wiped out during a disaster, the newly setup queues may be in any state, such as an empty state. The physical offsets of the messages in the new queues may no longer match the offset of backed up messages. To compensate, a logical queue for a slice may be presented to orchestration service instance, where the logical queue has monotonically increasing message offsets. The message offsets of the messages may be preserved after recovery. The message offset preservation facilitates checkpointing for in-memory caches. The logical memory offsets, rather than the physical offsets, may be stored in a checkpoint/snapshot for an in-memory cache. These logical memory offsets remain valid during recovery, despite the state of the queue to which the messages are restored.

Figure 8:
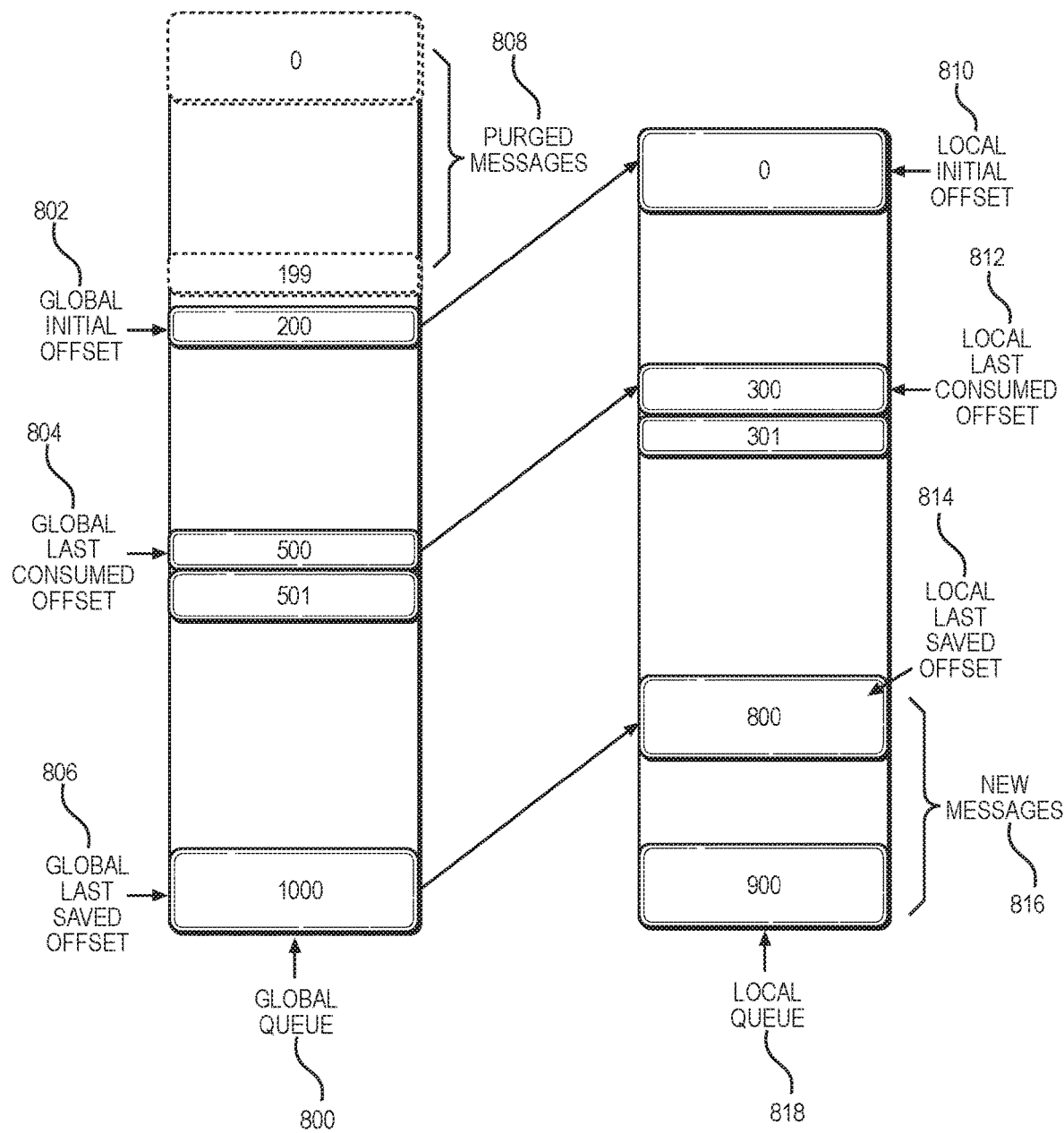
FIG. 8 illustrates an example mapping between a global queue and a local queue in accordance with one or more embodiments.

An offset refers to the position of a message in a queue. A mapping of physical offsets to logical offsets may be maintained. For example, FIG. 8 illustrates an example mapping between a global queue and a local queue in accordance with one or more embodiments. As illustrated, three different global offsets map to three corresponding local offsets. Global initial offset 802 is mapped to local initial offset 810, global last consumed offset 804 is mapped to local last consumed offset 812, and global last saved offset 806 is mapped to local last saved offset 814. A description of the illustrated elements is provided as follows:

Local queue 818 represents a queue that an orchestration service instance uses for executing workflows;
Local initial offset 810 is the initial message offset of a local queue, which may be 0 for a fresh installed queue;
Global queue 800 is a queue that is backed up and stored remotely;
Global initial offset 802 is the logical offset for the initial message in global queue 800;

Local last consumed offset 812 represents a position where any messages at or below this offset have been fully consumed and do not need to be processed for recovery;

Global last consumed offset 804 is a logical position where any messages at or below the offset that have been fully consumed and do not need to be processed for recovery and may be computed as the local last consumed offset−the local initial offset+the global initial offset;

Local last saved offset 814 is the highest message offset that was saved into global queue 800;

Global last saved offset 806 corresponds to local last saved offset but is defined with respect to global queue 800;

Purged messages 808 are messages that may be deleted from storage to reduce the storage overhead of global queue 800; and New message 816 are newly received messages that have not yet been backed up.

The global offsets are logical offsets defined with respect to global queue 800. The local offsets are defined with respect to local queue 818 and may be physical offsets.

As workloads are partitioned by the slice, messages are organized by the slice as well. A new owning execution instance of a given failed slice may be a different execution instance after recovery. In some cases, the new owning execution instance of the given failed slice may be the same execution instance prior to the failure after recovery. The state of the queue to which the messages are restored may vary from one execution instance to the next. The logical offsets that are preserved allow the messages to be mapped to any physical offset within a queue while maintaining the correct logical positioning of the restored messages. For example, the messages may have a different physical offset in a queue when a slice is reassigned to a new execution instance; however, the logical offsets remain the same.

In one or more embodiments, restoration happens on a per slice basis. The restore may wait until slice manager 108 has determined which slices have been allocated to an orchestration service instance. Restoration may happen during instance startup or new slice ownership taken during runtime. To restore all state, a message journal daemon (or other process) may restore the messages from a backup. A snapshot restoration process may then restore the execution context, such as tree structures, output variable values, and other data as previously described. Once the restoration phase is complete, the orchestration service instance may proceed to the running phase.

4.3 Lease Manager Failover

In one or more embodiments, multiple instances of lease manager 132 are executed to provide high availability. If one lease manager instance fails, lease requests may be routed to another instance. As each lease manager instance has a consistent view of the state information, the lease acquisition and negotiation processes described above are not affected, even when different instances of the lease manager process the requests.

If lease manager 132 completely fails and no lease manager instances are available, the leasing clients may continue to operate. As previously described, the slice and resource group information are persistently stored. Thus, even if the owner and lease information has been lost, leasing clients may re-request leases when one or more new lease manager instances are up and running. The lease acquisition process previously described may be used to reacquire the leases.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more computing devices. The computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, FPGAs, or NPUs with custom programming to accomplish the techniques. The computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, by a network service, submission of a workload that includes a plurality of workflow executions;
receiving, by the network service from a first client of a plurality of clients, a first request to lease a first slice of a plurality of slices of the workload, wherein each slice of the plurality of slices corresponds to a different subset of one or more workflow executions in the workload;
assigning, by the network service to the first client, a lease for the first slice, wherein the lease expires after a lease duration;
receiving, by the network service from a second client of the plurality of clients, a request to lease a slice of the plurality of slices of the workload;
determining, by the network service, whether a second request to renew the lease for the first slice has been received by the first client after the lease duration has lapsed;
determining, based at least in part on whether the second request to renew the lease has been received, whether to reassign the lease for the first slice to the second client or renew the lease for the first slice to the first client;
responsive to detecting the second request to renew the lease has been received, extending, by the network service, the lease for the first slice by the lease duration.

2. The method of claim 1, further comprising: assigning to the first client a second lease for a second slice; wherein the first client does not renew the second lease responsive to detecting the request to lease the slice from the second client to balance distribution of the plurality of slices; reassigning the second lease to the second client; wherein the second client processes at least one workflow execution, of the subset of one or more workflow executions corresponding to the second slice, that have not been processed by the first client.

3. The method of claim 1, wherein the lease duration is determined based on resource type; wherein the first slice is associated with a first type of computing resource; the method further comprising: assigning, by the network service to a third client, a second lease for a second slice of the plurality of slices of the workload, wherein the second lease is associated with a second type of computing resource; and wherein the second lease expires after a second lease duration that is different than the lease duration.

4. The method of claim 1, wherein the first slice is associated with a first resource group of a plurality of resource groups; wherein the lease duration is determined based on the first resource group, wherein a second resource group is associated with a second lease duration that is shorter than the lease duration for the first resource group to allow for quicker load rebalancing.

5. The method of claim 1, further comprising sending, by the network service to the first client during a lease renewal process, an indication that the second client has requested a lease for the first slice.

6. The method of claim 5, wherein the indication is a hash code; wherein the network service updates the hash code responsive to detecting a change in at least one of a set of clients, computing resources, or leases that are associated with a resource group to which the slice belongs.

7. The method of claim 1, wherein the subset of one or more workflow executions corresponding to the first slice includes two or more workflow executions, the method further comprising: distributing at least one of the two or more workflow executions corresponding to the first slice to at least one other slice of the plurality of slices based at least in part on how many clients are available to lease slices.

8. The method of claim 1, further comprising storing, for the first slice within a first in-memory cache, a set of messages that are assigned a logical position within a queue, the method further comprising: restoring the set of messages to a second in-memory cache, wherein the messages have a different physical position than in the first in-memory cache; wherein the set of messages maintain the same logical position within the queue.

9. One or more non-transitory computer-readable media storing instructions which, when executed by one or more hardware processors, cause performance of operations comprising:
receiving, by a network service, submission of a workload that includes a plurality of workflow executions;
receiving, by the network service from a first client of a plurality of clients, a first request to lease a first slice of a plurality of slices of the workload, wherein each slice of the plurality of slices corresponds to a different subset of one or more workflow executions in the workload;
assigning, by the network service to the first client, a lease for the first slice, wherein the lease expires after a lease duration;
receiving, by the network service from a second client of the plurality of clients, a request to lease a slice of the plurality of slices of the workload;
determining, by the network service, whether a second request to renew the lease for the first slice has been received by the first client after the lease duration has lapsed;
determining, based at least in part on whether the second request to renew the lease has been received, whether to reassign the lease for the first slice to the second client or renew the lease for the first slice to the first client;
responsive to detecting the second request to renew the lease has been received, extending, by the network service, the lease for the first slice by the lease duration.

10. The one or more non-transitory computer-readable media of claim 9, the operations further comprising: assigning to the first client a second lease for a second slice; wherein the first client does not renew the second lease responsive to detecting the request to lease the slice from the second client to balance distribution of the plurality of slices; reassigning the second lease to the second client; wherein the second client processes at least one workflow execution, of the subset of one or more workflow executions corresponding to the second slice, that have not been processed by the first client.

11. The one or more non-transitory computer-readable media of claim 9, wherein the lease duration is determined based on resource type; wherein the first slice is associated with a first type of computing resource; the operations further comprising: assigning, by the network service to a third client, a second lease for a second slice of the plurality of slices of the workload, wherein the second lease is associated with a second type of computing resource; and wherein the second lease expires after a second lease duration that is different than the lease duration.

12. The one or more non-transitory computer-readable media of claim 9, wherein the first slice is associated with a first resource group of a plurality of resource groups; wherein the lease duration is determined based on the first resource group, wherein a second resource group is associated with a second lease duration that is shorter than the lease duration for the first resource group to allow for quicker load rebalancing.

13. The one or more non-transitory computer-readable media of claim 9, the operations further comprising sending, by the network service to the first client during a lease renewal process, an indication that the second client has requested a lease for the first slice.

14. The one or more non-transitory computer-readable media of claim 13, wherein the indication is a hash code; wherein the network service updates the hash code responsive to detecting a change in at least one of a set of clients, computing resources, or leases that are associated with a resource group to which the slice belongs.

15. The one or more non-transitory computer-readable media of claim 9, wherein the subset of one or more workflow executions corresponding to the first slice includes two or more workflow executions, the operations further comprising: distributing at least one of the two or more workflow executions corresponding to the first slice to at least one other slice of the plurality of slices based at least in part on how many clients are available to lease slices.

16. The one or more non-transitory computer-readable media of claim 9, the operations further comprising storing, for the first slice within a first in-memory cache, a set of messages that are assigned a logical position within a queue, the operations further comprising: restoring the set of messages to a second in-memory cache, wherein the messages have a different physical position than in the first in-memory cache; wherein the set of messages maintain the same logical position within the queue.

17. The one or more non-transitory computer-readable media of claim 9, wherein the first client determines whether to submit the second request to renew the lease for the first slice based at least in part on the request to lease a slice from the second client; wherein the first client detects that the second client has requested to lease the slice based on state information maintained by the network service.

18. The one or more non-transitory computer-readable media of claim 9, wherein the first slice corresponds to two or more workflow executions; wherein the first client manages a set of computing resources for executing the two or more workflow executions; wherein the first client splits the two or more workflow executions across multiple computing resources to execute at least a portion of the two or more workflow executions in parallel.

19. The one or more non-transitory computer-readable media of claim 9, wherein the second request to renew the lease for the first slice is a ping message.

20. The one or more non-transitory computer-readable media of claim 9, wherein the operations further cause adjusting how many slices are allocated for the workload based at least in part on how many clients are available.

* * * * *